(12) United States Patent
Wilkinson et al.

(10) Patent No.: US 6,541,145 B2
(45) Date of Patent: Apr. 1, 2003

(54) FLOW FIELDS FOR SUPPORTING FLUID DIFFUSION LAYERS IN FUEL CELLS

(75) Inventors: David Pentreath Wilkinson, North Vancouver (CA); Olen R. Vanderleeden, Coquitlam (CA); Joerg Zimmerman, Vancouver (CA)

(73) Assignee: Ballard Power Systems, Inc., Burnaby (CA)

( * ) Notice: Subject to any disclaimer, the term of this patent is extended or adjusted under 35 U.S.C. 154(b) by 123 days.

(21) Appl. No.: 09/752,548

(22) Filed: Dec. 28, 2000

(65) Prior Publication Data

US 2001/0041281 A1 Nov. 15, 2001

Related U.S. Application Data

(63) Continuation-in-part of application No. 09/567,500, filed on May 9, 2000.

(51) Int. Cl.$^7$ .............................. H01M 2/00; H01M 8/00
(52) U.S. Cl. ............................ 429/34; 429/38; 429/39; 429/12
(58) Field of Search ................................ 429/39, 38, 34, 429/30, 12

(56) References Cited

U.S. PATENT DOCUMENTS 5,863,671 A * 1/1999 Spear et al. .................. 429/12
6,007,933 A * 12/1999 Jones ......................... 204/282

FOREIGN PATENT DOCUMENTS

EP          0 924 785          6/1999

* cited by examiner

Primary Examiner—Stephen Kalafut
Assistant Examiner—Raymond Alejandro
(74) Attorney, Agent, or Firm—McAndrews, Held & Malloy, Ltd.

(57) ABSTRACT

An improved flow field design for a flow field plate comprises fluid distribution channels having an average width W and separated by landings in which the channels are configured such that unsupported rectangular surfaces of length L and width W on an adjacent fluid diffusion layer have a ratio L/W less than about 3. Improved support may be obtained for instance by using sinusoidally shaped channels. Certain fluid diffusion layer embodiments offer desirable characteristics (for example, low cost, thickness) for use in fuel cells but may also be undesirably weak mechanically and consequently will benefit from improved mechanical support from adjacent flow field plates comprising the present flow field design.

15 Claims, 4 Drawing Sheets

FLOW FIELDS FOR SUPPORTING FLUID DIFFUSION LAYERS IN FUEL CELLS

CROSS-REFERENCE TO RELATED APPLICATION

This application is a continuation-in-part of U.S. patent application Ser. No. 09/567,500 filed May 9, 2000, entitled "Differential Pressure Fluid Flow Fields For Fuel Cells". The '500 application is incorporated herein by reference in its entirety.

FIELD OF THE INVENTION

The present invention relates to fluid flow fields for fuel cells. More particularly, it relates to flow field designs for supporting structurally weak and/or mechanically anisotropic fluid diffusion layers in solid polymer electrolyte fuel cells.

BACKGROUND OF THE INVENTION

Fuel cell systems are currently being developed for use as power supplies in numerous applications, such as automobiles and stationary power plants. Such systems offer promise of economically delivering power with environmental and other benefits.

Fuel cells convert reactants, namely fuel and oxidants, to generate electric power and reaction products. Fuel cells generally employ an electrolyte disposed between two electrodes, namely a cathode and an anode. A catalyst typically induces the desired electrochemical reactions at the electrodes. Preferred fuel cell types include solid polymer electrolyte fuel cells that comprise a solid polymer electrolyte and operate at relatively low temperatures.

During normal operation of a solid polymer electrolyte fuel cell, fuel is electrochemically oxidized at the anode catalyst, typically resulting in the generation of protons, electrons, and possibly other species depending on the fuel employed. The protons are conducted from the reaction sites at which they are generated, through the electrolyte, to electrochemically react with the oxidant at the cathode catalyst. The catalysts are preferably located at the interfaces between each electrode and the adjacent electrolyte.

A broad range of fluid reactants can be used in solid polymer electrolyte fuel cells and may be supplied in either gaseous or liquid form. For example, the oxidant stream may be substantially pure oxygen gas or a dilute oxygen stream such as air. The fuel may be, for example, substantially pure hydrogen gas, a gaseous hydrogen-containing reformate stream, or an aqueous liquid methanol mixture in a direct methanol fuel cell. Reactants are directed to the fuel cell electrodes and are distributed to catalyst therein by means of fluid diffusion layers. In the case of gaseous reactants, these layers are referred to as gas diffusion layers.

Solid polymer electrolyte fuel cells employ a membrane electrode assembly ("MEA") which comprises the solid polymer electrolyte or ion-exchange membrane disposed between the two electrodes. Each electrode contains a catalyst layer, comprising an appropriate catalyst, located next to the solid polymer electrolyte. The catalyst may, for example, be a metal black, an alloy or a supported metal catalyst, for example, platinum on carbon. The catalyst layer may contain ionomer which may be similar to that used for the solid polymer electrolyte (for example, Nafion®). The catalyst layer may also contain a binder, such as polytetrafluoroethylene. The electrodes may also contain a substrate (typically a porous electrically conductive sheet material) that may be employed for purposes of mechanical support and/or reactant distribution, thus serving as a fluid diffusion layer.

The MEA is typically disposed between two plates to form a fuel cell assembly. The plates act as current collectors and provide support for the adjacent electrodes. The assembly is typically compressed (for example, at about 70 psi overall) to ensure good electrical contact between the plates and the electrodes, in addition to good sealing between fuel cell components. A plurality of fuel cell assemblies may be combined in series or in parallel to form a fuel cell stack. In a fuel cell stack, a plate may be shared between two adjacent fuel cell assemblies, in which case the plate also serves as a separator to fluidly isolate the fluid streams of the two adjacent fuel cell assemblies.

In a fuel cell, flow fields are employed for purposes of directing reactants across the surfaces of the fluid diffusion electrodes or electrode substrates. The flow fields comprise fluid distribution channels separated by landings and may be incorporated in the current collector/support plates on either side of the MEA. The channels provide passages for the distribution of reactant to the electrode surfaces and also for the removal of reaction products and depleted reactant streams. The landings act as mechanical supports for the fluid diffusion layers in the MEA and provide electrical contact thereto. Thus, flow fields serve a variety of functions, and appropriate flow field designs involve a balance of the various related requirements in order to obtain satisfactory results overall.

In an effort to improve fuel cell performance and to reduce the thickness and cost of membrane electrode assemblies, there is a trend to use thinner, more porous materials for the fluid diffusion layers. However, these materials tend to be weaker mechanically. In addition, certain mass produced materials having some of these desirable features also have anisotropic mechanical properties relating to the method of production (for example, they have an orientation or grain direction). In operation, some materials used as fluid diffusion layers may delaminate with time (for example, from exposure to water at high temperatures breaking down resins in the material) thereby weakening the layer mechanically. These weaker and/or mechanically anisotropic materials may require more support than that provided by conventional flow field plates in order to prevent the material from deflecting into the flow field channels under the compressive loads applied in the fuel cell stack. If deflection of the diffusion layer material is not prevented, channels become obstructed, thus impairing the distribution of reactants and/or removal of reaction products and adversely affecting fuel cell performance. In addition, deflection of the material can itself result in delamination too.

Simply increasing the landing area and/or the number of similar lands in a flow field design may improve the mechanical support of an adjacent fluid diffusion layer but this also adversely affects fluid access to and from the fluid diffusion layer. Support may however be improved without necessarily increasing landing area. For instance, additional support members may be inserted between the flow field plates and the diffusion layers as disclosed in U.S. Pat. No. 6,007,933. In that patent, the use of support members such as meshes or expanded metals was disclosed in order to provide enhanced stability to the diffusion layers. However, that approach involves the use of additional components which increase cell thickness, complexity, and cost.

Alternatively, improved mechanical support may be provided without adversely affecting fluid access to and from the diffusion layer by using flow fields with smaller, more closely spaced channels such as those disclosed in published PCT patent application number WO 00/26981. In that application, performance results were disclosed for flow fields having channels with inclined walls and with reduced channel and land widths adjacent the diffusion layer of approximately 300 µm and 30 µm respectively. By reducing the span across the flow channel, the "tenting" or deflection of soft diffusion layers into the channels may also be reduced. However, the diffusion layer span parallel to the channels can still be relatively large (with straight channels, the span is the length of the flow field). This may still be a concern, particularly if the adjacent diffusion layer is anisotropic with a grain direction parallel to the channels.

A variety of other flow field designs have been proposed in the art for one reason or another that may also provide improved support of mechanically weak fluid diffusion layers. For instance, flow field plates with interdigitated inlet and outlet channels formed in porous plates (for example, as disclosed in U.S. Pat. No. 5,641,586) may provide improved support via relatively large porous land areas in the porous plate. Woven metal meshes might be employed that directly define a rectangular flow field pattern (for example, as disclosed in U.S. Pat. No. 5,798,187). However, again the diffusion layer span parallel to the channels in these designs may be relatively large and the use of such designs may also involve certain other disadvantages.

SUMMARY OF THE INVENTION

A flow field design is provided that is capable of supporting mechanically weak and/or anisotropic fluid diffusion layers in a fuel cell while still adequately supplying a fluid reactant to a fluid diffusion electrode comprising such a diffusion layer and adequately removing depleted reactant and reaction products therefrom. Herein, an anisotropic fluid diffusion layer refers to a layer with significant differences in mechanical properties between the two dimensions defining the major surface of a sheet-like fluid diffusion layer. It particularly refers to those layers having relatively high bending strength in one major dimension (for example, parallel to the "grain") and relatively weak bending strength in another (perpendicular to the "grain").

The flow field comprises one or more fluid distribution channels separated by landings in which the landings mechanically support the fluid distribution layer. Typically, the flow field comprises a plurality of fluid distribution channels. The channels in the flow field have an average channel width W and are configured such that essentially any unsupported rectangular surface of length L and width W on an adjacent fluid diffusion layer has a ratio L/W less than about 3. Any linear portions in the flow field channels are therefore essentially all less than 3 times the average channel width. (For a flow field channel whose average channel width is less than about 1 mm, a linear portion in a flow field channel therefore has a length of less than about 3 mm.) Any non-linear portions in the flow field channels are configured such that unsupported rectangular surfaces on the diffusion layer are all essentially smaller than 3W by W in size as well. Thus, the diffusion layer surface is reasonably supported in essentially every direction.

Support may be particularly improved over conventional straight channel configuration flow fields (or those comprising channels with significant linear portions) when the ratio L/W is less than about 2. Again, for flow fields whose average channel width is less than about 1 mm, this corresponds to a linear portion in a flow field channel being less than about 2 mm.

A suitable flow field configuration comprises fluid distribution channels that are shaped in a wave form, such as a sinusoidal shaped wave form. Modifications of sinusoidal or similar shaped wave forms may also be used.

The fluid distribution channels may also be cross connected. This may be desirable in order to minimize the effect of any channel blockages (for example, by water reaction product) or to force some fluid flow to occur in the regions of the fluid diffusion layer directly above the landings (by momentum or differences in gas velocity between channels). With sufficient multiple cross connections, the flow field may resemble a pattern of dimples or posts in which the dimples or posts mechanically support the fluid diffusion layer.

The flow fields are advantageous for use in a fuel cell comprising a fluid diffusion electrode which employs a fluid diffusion layer that is relatively weak mechanically or is anisotropic such that it is relatively weak in one major dimension. Weak fluid diffusion layers include those with a Taber stiffness less than about 2 Taber units or that deflect more than about 50 micrometers over a 900 micrometer span under the mechanical loading applied over the fuel cell plates. The flow fields are particularly suitable for use in solid polymer electrolyte fuel cells employing thin, highly porous diffusion layers. Such diffusion layers may comprise carbon fibres and be manufactured in continuous webs in such a way that the fibres become aligned (oriented) in the machine direction and thus the web has a "grain". As a consequence, such webs may have significantly weaker bending strength perpendicular to the grain.

DETAILED DESCRIPTION OF THE PREFERRED EMBODIMENTS

Figure 1:
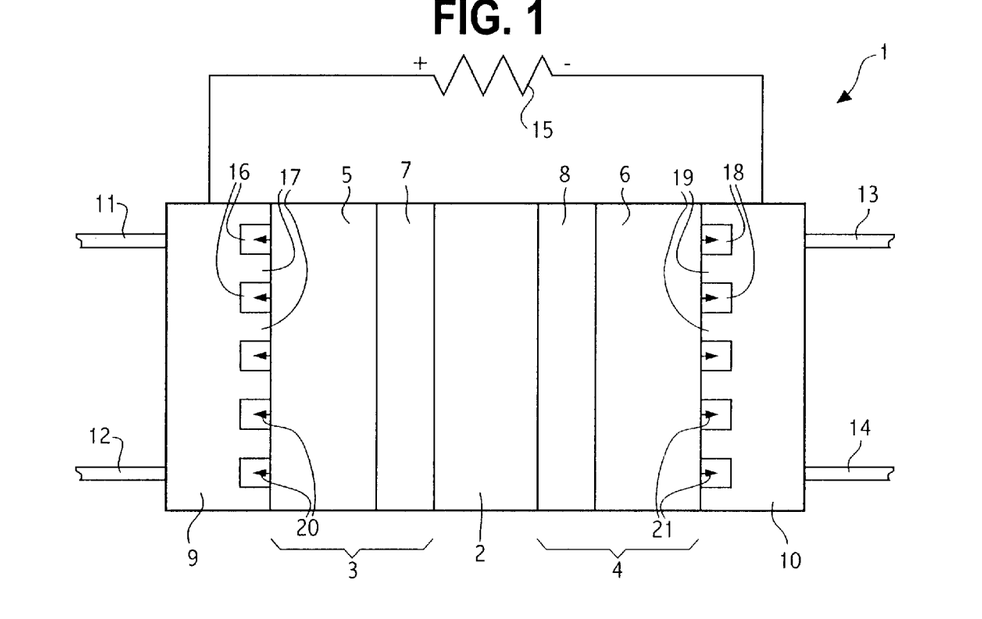
FIG. 1 is a schematic diagram of a solid polymer electrolyte fuel cell stack comprising flow field plates.

A schematic diagram of a solid polymer fuel cell stack is depicted in FIG. 1. For simplicity, FIG. 1 shows only one cell in the fuel cell stack. Stack 1 comprises a membrane electrode assembly consisting of solid polymer electrolyte membrane 2 sandwiched between cathode 3 and anode 4. Cathode 3 comprises porous fluid diffusion layer 5 and catalyst layer 7. Anode 4 comprises porous fluid diffusion layer 6 and catalyst layer 8. Fluid diffusion layers 5, 6 serve as electrically conductive backings and mechanical supports for catalyst layers 7, 8. Fluid diffusion layers 5, 6 also serve to distribute fluid reactants from flow field plates 9, 10 to catalyst layers 7, 8. During operation, oxidant and fuel are supplied to flow field plates 9 and 10 respectively at inlets 11 and 13 respectively. The oxidant and fuel streams exhaust from stack 1 at outlets 12 and 14 respectively. During operation, power is delivered to a load depicted as resistor 15.

Flow field plates 9, 10 comprise flow fields with fluid distribution channels 16, 18 which deliver reactants directly to surfaces of diffusion layers 5, 6. Flow field plates also comprise landings 17, 19 which form the walls of channels 16, 18 and which mechanically support diffusion layers 5, 6. The compressive loads within stack 1 act so as to deflect diffusion layers 5, 6 into channels 16, 18, as illustrated by arrows 20, 21 respectively. Excessive deflection of the diffusion layers into the channels would adversely affect distribution of reactant to the layers and removal of depleted reactant and/or reaction products from the layers.

In conventional flow field plates with fluid distribution channels, there are significant linear sections in the channels. For instance, in a conventional flow field plate comprising a series of parallel through channels, the channels are linear over the entire length of the plate. In conventional flow field plates comprising one or more parallel serpentine channels, typically there are linear channel sections between bends whose lengths are comparable to the width of the plate. Even employing narrow channel widths, the mechanical support provided by such conventional flow field designs may be insufficient for certain weak or anisotropic fluid diffusion layers.

Preferred materials for fluid diffusion layers are thin, highly porous, inexpensive, and compatible with the fuel cell electrochemistry. Carbon fibre products (for example, carbon paper, cloth, non-wovens) are examples of potentially suitable diffusion layer materials for solid polymer electrolyte fuel cells. Carbon fibre webs can be obtained commercially in thicknesses lower than about 800 $\mu$m, porosities up to 99%, and weights/area less than about 20 g/m$^2$. Such webs can be made in a continuous fashion using reel-reel techniques and machinery, but such techniques often result in web products whose characteristics in the machine direction (parallel to the web) differ somewhat from those transverse to the machine direction (perpendicular to the web). TFP™ carbon fibre mat for example exhibits such differences as a result of fibre orientation in the machine direction ("grain"). TFP™ carbon fibre mat is a particularly preferred diffusion layer material insofar as thickness, porosity, and cost are concerned. Taber stiffness is a measure of a web's resistance to bending. The Taber stiffness for TFP™ carbon fibre mat is less than about 4 in the machine direction (depending on the thickness of the mat and the types and/or loading of organic binder) and less than about 2 transverse to the machine direction. Such a web is weakest therefore transverse to the machine direction. (Taber measurements are commonly employed in the paper industry. Herein, Taber is determined according to test method ASTM D5342-95.)

In the manufacture of a solid polymer fuel cell, the other MEA components, the assembled MEAs, and the flow field plates may also be made using reel-reel techniques. In such a case, it is usually preferred for purposes of manufacturing simplicity that the various components or sub-assemblies align in the web or machine directions for subsequent assembly. Since linear channels or sections of channels in the flow field plates are also often conveniently formed parallel to the web direction, this can lead to the linear flow field channels or sections thereof being aligned with the other webs. Hence, the diffusion layers may be aligned such that they are unsupported by the flow field plates along their weakest direction.

Difficulties supporting weak diffusion layers may be overcome by appropriately reducing the length of the linear sections of the channels in the flow field plates. Significant improvement in support can be achieved by use of a flow field design in which the linear sections are less than about three times the average channel width, and preferably less than about two times the average channel width. Significant improvement in support can also be achieved by using suitable non-linear flow field designs that provide equivalent support (for example, unsupported rectangular surfaces on the fluid diffusion layer are not larger than a rectangle having a side equal to three times the average channel width and a side equal to the average channel width).

Figure 2A:
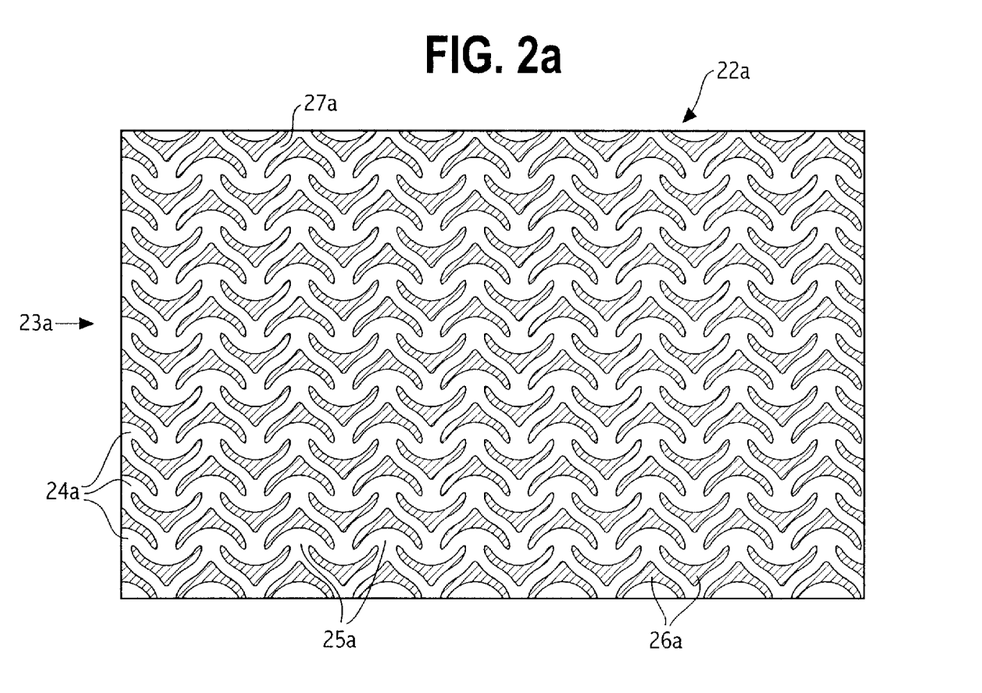
FIG. 2a shows a section of a flow field design for supporting weak diffusion layers having multiply interconnected sinusoidally shaped channels. (For illustrative purposes, the dimensions in all FIGS. 2a–e are not to scale.)

FIG. 2a shows one option for a flow field design suitable for supporting weak diffusion layers. For illustrative purposes, certain dimensions in FIGS. 2a–2e are not to scale, such as the preferred ratio of landing width to channel width. However, the aspect regarding improved support is generally illustrated. In FIG. 2a, section 22a of a flow field is shown in which the net direction of reactant flow is indicated by arrow 23a. Channels 24a in this design are generally sinusoidally shaped and have multiple cross-connections 25a therebetween. The average width of channels 24a is represented by dimension 27a. The supporting lands 26a appear as discrete, generally crescent shaped posts in this design. For purposes of supporting weak and/or anisotropic fluid diffusion layers, the flow field in FIG. 2a is configured such that unsupported rectangular surfaces on the fluid diffusion layer are essentially not larger than a rectangle that is 3 times dimension 27a by dimension 27a in size. The non-linear nature of the sinusoidal channels ensures that the width of an unsupported rectangular surface above the channel will be smaller than dimension 27a. Cross-connections 25a are generally configured such that an unsupported rectangular surface above a cross-connection will also not be larger than a rectangle that is 3 times dimension 27a by dimension 27a in size. (In an alternative embodiment, the net direction of reactant flow may instead be perpendicular to that depicted in FIG. 2a.)

Figure 2B:
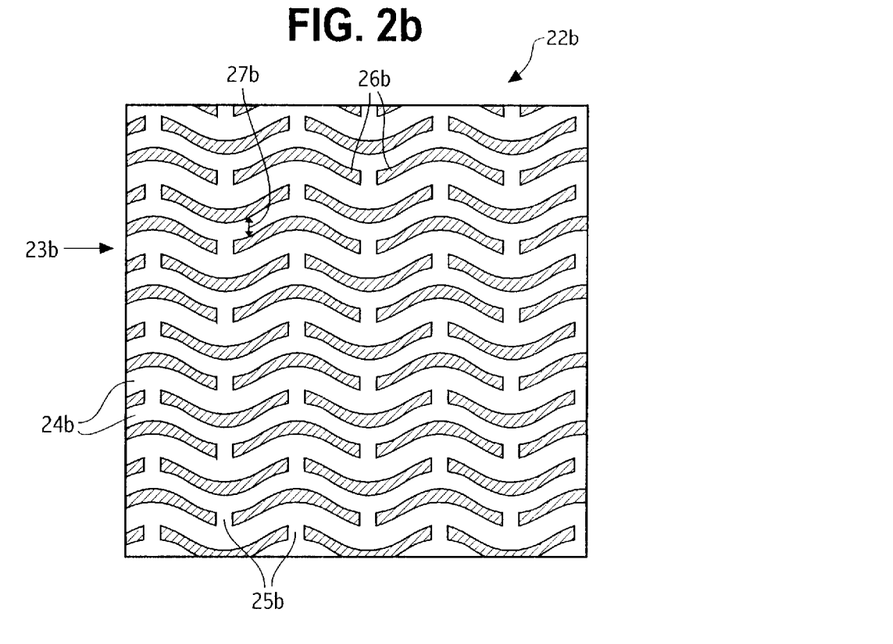
FIG. 2b shows a section of another flow field design for supporting weak diffusion layers.
Figure 2C:
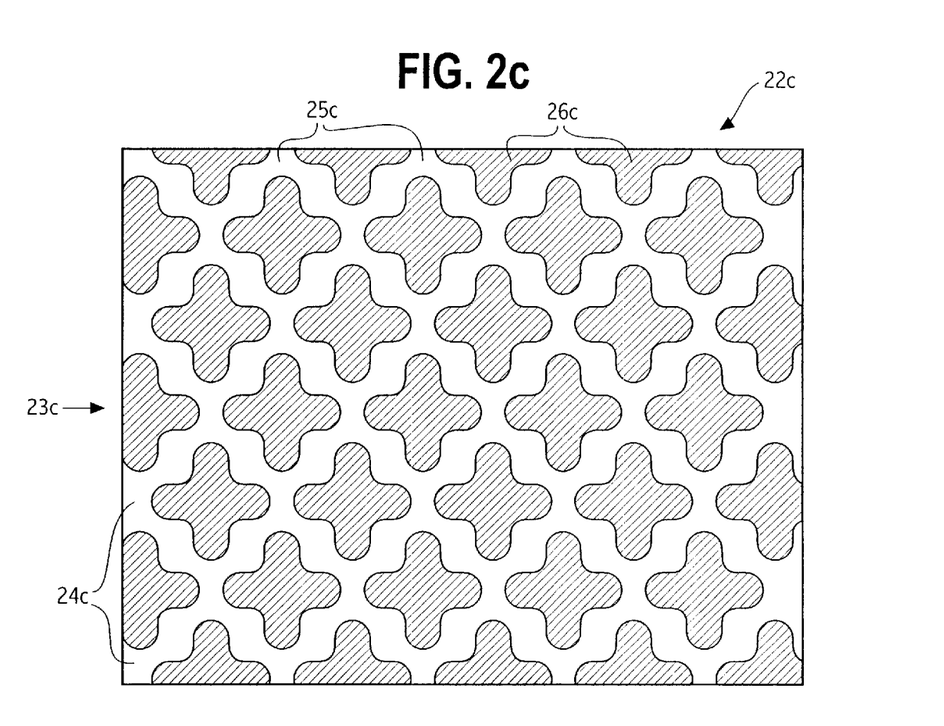
FIG. 2c shows a section of another flow field design for supporting weak diffusion layers.
Figure 2D:
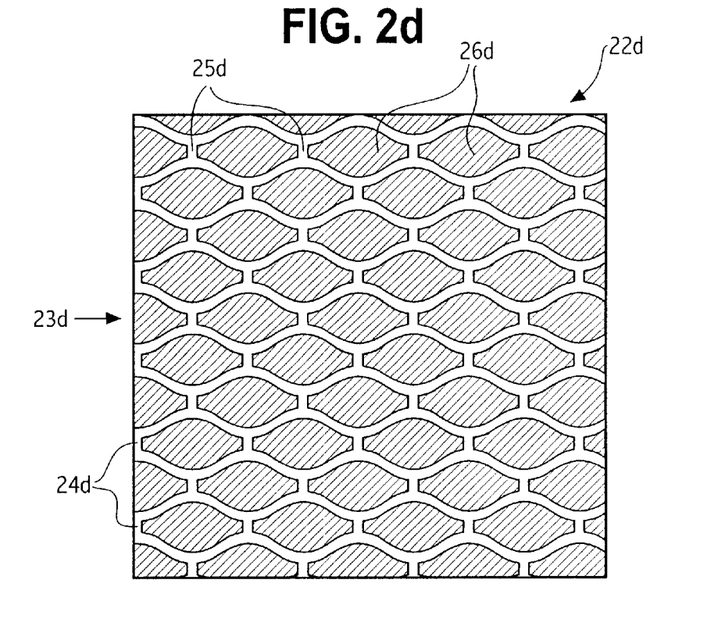
FIG. 2d shows a section of another flow field design for supporting weak diffusion layers.
Figure 2E:
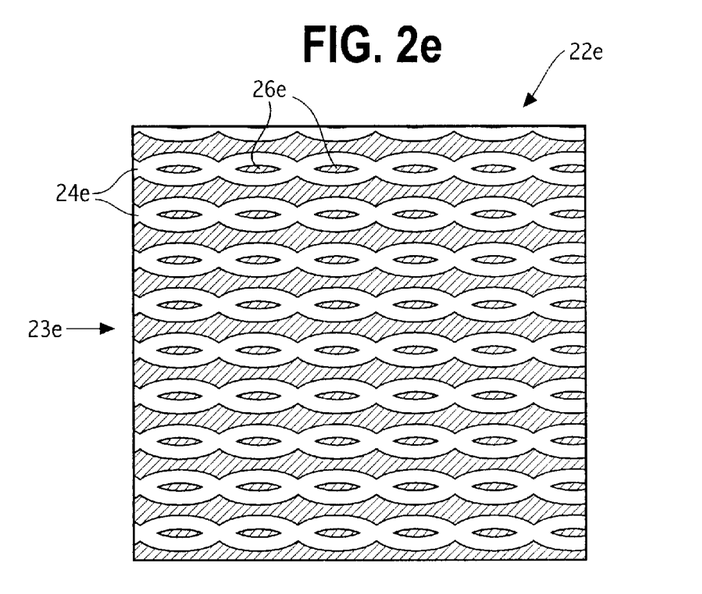
FIG. 2e shows a section of another flow field design for supporting weak diffusion layers.

FIG. 2b shows a section of another flow field design suitable for supporting weak diffusion layers. The flow field of FIG. 2b is similar to that of FIG. 2a although the relative sizes and/or shapes of the channels, lands, and cross-connections differ to some extent. In FIG. 2b, the net direction of reactant flow is indicated by arrow 23b. Channels 24b in flow field section 22b are sinusoidally shaped and have multiple cross-connections 25b therebetween. The supporting lands 26b appear as discrete, generally crescent shaped posts, which are broader and more extended in configuration than the generally crescent shaped supporting lands 26a in FIG. 2a. The average width of channels 24b is represented by dimension 27b FIGS. 2c, 2d, and 2e show sections of alternative flow field designs for supporting weak diffusion layers. In each flow field section 22c, 22d, and 22e, the net direction of reactant flow is indicated by corresponding arrows 23c, 23d, and 23e. Channels are indicated by corresponding reference numerals 24c, 24d, and 24e while lands are indicated by corresponding reference numerals 26c, 26d, and 26e. FIGS. 2c and 2d depict channels 24c and 24d with multiple cross-connections 25c and 25d. FIG. 2e shows pairs of sinusoidal shaped channels 24e that are 180° out of phase and cross at the nodes. Each pair of channels 24e may optionally be cross-connected to an adjacent pair if desired (not shown).

In all the preceding FIGS. 2a–2e, for purposes of supporting weak and/or anisotropic fluid diffusion layers, the flow fields are configured such that unsupported rectangular surfaces on the fluid diffusion layer are not larger than a rectangle having a side equal to three times the average channel width and a side equal to the average channel width. In all the embodiments shown, the net direction of reactant flow may be different from that depicted. Further, those skilled in the art will appreciate that, to a limited extent, it is possible to include a certain number of regions in the flow field plate design in which there exist unsupported rectangular diffusion layer surfaces larger than this without materially affecting the basic and novel characteristics of the present techniques. Thus, a flow field embodiment may include an occasional larger unsupported surface, but most or essentially all unsupported rectangular regions on the fluid diffusion layer are not larger than this.

Figure 3:
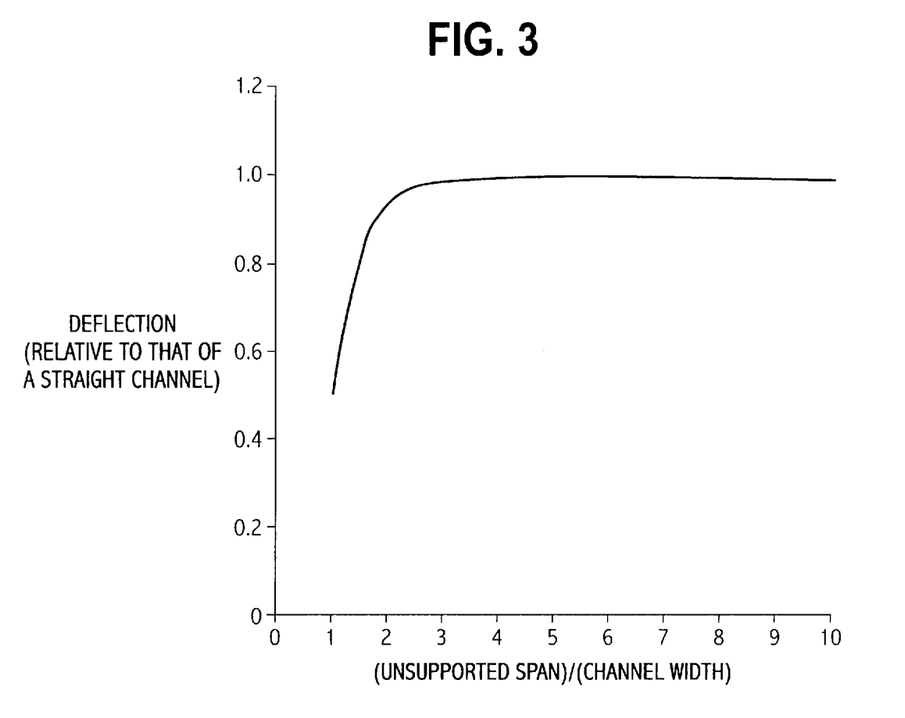
FIG. 3 shows a plot of the maximum calculated deflection of an edge supported isotropic rectangular surface of a fluid diffusion layer under a uniformly applied load. The longer side of the rectangular surface is variable and represents unsupported layer length (span). The shorter side is fixed and represents channel width. The deflection is plotted as a function of the ratio of unsupported length to channel width.

The effect that such a design has on preventing deflection can be estimated. An unsupported region of the fluid diffusion layer may be considered to be an edge supported rectangular plate in which the longer side of the rectangle is of variable length and represents the unsupported span, while the shorter side is of fixed length and represents the channel width. The deflection of the diffusion layer, w, obeys the relationship:

$$w_{xxxx} + 2w_{xxyy} + w_{yyyy} = p/D$$

wherein the subscripts denote partial derivatives with respect to the x and y axes, p is the distributed load on the diffusion layer, and D is the flexural rigidity of the fluid diffusion layer. For an isotropic rectangular plate with a uniformly applied load, p, the solution of this equation approximates as:

$$w_{max} = (0.32/(1+(b/a)^4)) (1-v^2) (pb^4/(Et^3))$$

wherein $W_{max}$ is the maximum deflection of the diffusion layer, b is the channel width, v is Poisson's ratio, E is Young's modulus, t is the thickness of the diffusion layer and a is the span or unsupported length of the diffusion layer. (The derivation of these equations can be found in *Advanced Mechanics of Materials* 5th Ed., A. P. Boresi, R. J. Schmidt and O. M. Sidebottom, pages 538–539). With all the parameters fixed except a, $w_{max}$ is proportional to $1/(1+(b/a)^4)$. This relationship is illustrated (for values of b>a) in FIG. 3 which shows the maximum calculated deflection of a fluid diffusion layer as a function of the ratio of unsupported span to channel width. The maximum deflection in FIG. 3 is given relative to that for a very long, rectangular surface (in other words, equivalent to that expected when long, straight flow field channels are employed). As can be seen, there is a significant effect on relative deflection for unsupported span/channel width ratios (b/a) less than about 3, and particularly for b/a ratios less than about 2.

Figure 4:
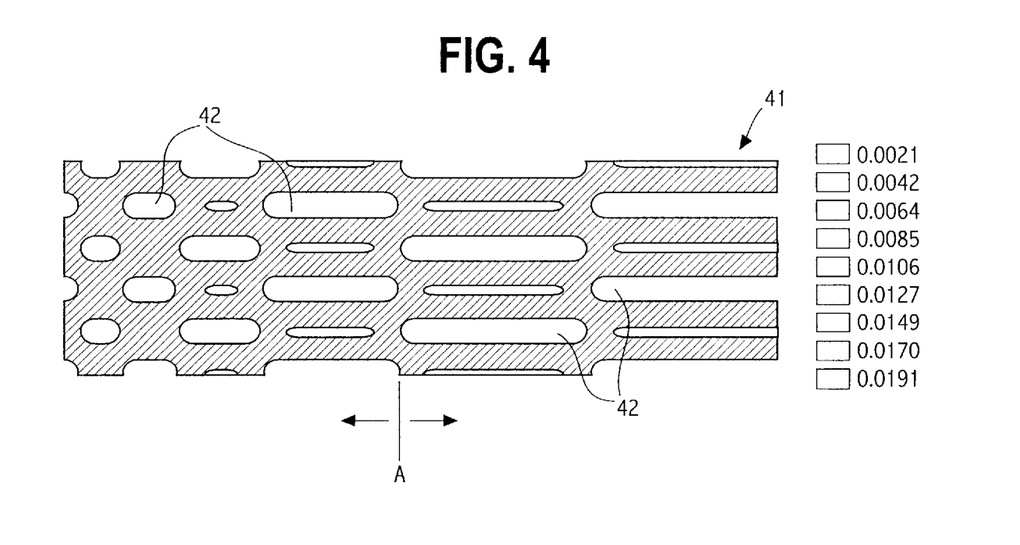
FIG. 4 shows the calculated deflection profile of a fluid diffusion layer supported by a flow field plate comprising channels having linear sections of varied length.

The effect of such a design on deflection is further illustrated in FIG. 4 which shows the calculated deflection profile of a fluid diffusion layer (or, alternatively, a membrane electrode assembly) supported by a flow field plate comprising channels with linear sections of varied length. In FIG. 4, it has been assumed that layer 41 is made of a 0.1 mm thick, isotropic material characterized by a Young's modulus of 2 GPa and Poisson's ratio of 0.1. The channel width in the supporting flow field was taken to be 1 mm and the landing width was 0.5 mm. It was further assumed that a pressure drop of 50 kPa was applied uniformly over the layer surface. The analysis was done using Ansys™ finite element analysis software. Layer deflection in millimeters is indicated by the various shaded regions according to the legend provided to the right of layer 41. The shaded regions correspond to the configuration of the channels in the supporting flow field and are thus roughly rectangular in shape with widths and lengths matching those of the linear sections of the channels below. The oblong, unshaded regions 42 indicate the location of landings in the supporting flow field. In FIG. 4, the shaded regions to the left of line A are less than three times the channel width in length. The shaded regions to the right of line A are greater than three times the channel width in length. As is evident in FIG. 4, there is a substantial reduction in deflection in the shaded regions to the left of line A.

Various other flow field patterns may be contemplated that combine the advantages of increased support with other desirable features. For instance, the flow field channels may also incorporate features that induce pressure differentials between channels (for example, using an interdigitated configuration or incorporating cyclical depth variations) to improve the distribution of reactant to the surface of the diffusion layer. The incorporation of cyclical depth variations and the like for this purpose is described in the aforementioned U.S. patent application Ser. No. 09/567,500 filed May 9, 2000, entitled "Differential Pressure Fluid Flow Fields For Fuel Cells". The flow channels may also be designed such that fluid momentum forces fluid flow into those regions of the diffusion layer supported by landings.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A flow field for supplying a fluid reactant to a fluid diffusion electrode in a fuel cell, said flow field comprising one or more fluid distribution channels having an average channel width W and separated by landings, said fluid diffusion electrode comprising a fluid diffusion layer, and said landings in said flow field mechanically supporting said fluid diffusion layer, wherein said flow field is characterized in that said one or more channels are configured such that essentially any unsupported rectangular surface of length L and width W on said fluid diffusion layer has a ratio L/W less than about 3.

2. The flow field of claim 1 wherein said ratio L/W is less than about 2.

3. The flow field of claim 1 wherein W is less than about 1 mm.

4. The flow field of claim 3 wherein L is less than about 3 mm.

5. The flow field of claim 4 wherein L is less than about 2 mm.

6. The flow field of claim 1 wherein said one or more fluid distribution channels are shaped in a wave form.

7. The flow field of claim 6 wherein said one or more fluid distribution channels are sinusoidal shaped.

8. The flow field of claim 1 comprising a plurality of fluid distribution channels.

9. The flow field of claim 8 wherein said plurality of fluid distribution channels are cross connected.

10. A fuel cell comprising a fluid diffusion electrode comprising a fluid diffusion layer wherein said fluid diffusion layer is mechanically supported by the flow field of claim 1.

11. The fuel cell of claim 10 wherein said fuel cell is a solid polymer electrolyte fuel cell.

12. The fuel cell of claim 10 wherein said fluid diffusion layer has a Taber stiffness less than about 2.

13. The fuel cell of claim 10 wherein said fluid diffusion layer is mechanically anisotropic.

14. A method of mechanically supporting a fluid diffusion layer in a fuel cell with a flow field, said flow field comprising one or more fluid distribution channels having an average channel width W and separated by landings which mechanically support said fluid diffusion layer, said method comprising configuring said one or more fluid distribution channels such that essentially any unsupported rectangular surface of length L and width W on said fluid diffusion layer has a ratio L/W less than about 3.

15. The method of claim 14 wherein said one or more fluid distribution channels are sinusoidal shaped.

* * * * *

UNITED STATES PATENT AND TRADEMARK OFFICE
CERTIFICATE OF CORRECTION

PATENT NO. : 6,541,145 B2
DATED : April 1, 2003
INVENTOR(S) : David P. Wilkinson et al.

It is certified that error appears in the above-identified patent and that said Letters Patent is hereby corrected as shown below:

<u>Title page,</u>
Item [56], References Cited, U.S. PATENT DOCUMENTS, please add:

| | | |
|---|---|---|
| -- 4,407,904 | Uozomi et al. | 10/83 |
| 4,631,239 | Spurrier et al. | 12/86 |
| 4,853,301 | Granata, Jr. et al. | 08/89 |
| 5,108,849 | Watkins et al. | 04/92 |
| 5,260,143 | Voss et al. | 11/93 |
| 5,366,818 | Wilkinson et al. | 11/94 |
| 5,441,819 | Voss et al. | 08/95 |
| 5,503,944 | Meyer et al. | 04/96 |
| 5,641,586 | Wilson | 06/97 |
| 5,686,199 | Calvaca et al. | 11/97 |
| 5,795,665 | Allen | 08/98 |
| 5,798,187 | Wilson et al. | 08/98 |
| 5,998,055 | Kurita et al. | 12/99 -- |

FOREIGN PATENT DOCUMENTS, please add:

| | | |
|---|---|---|
| -- WO 99/27601 | PCT | 06/99 |
| WO 00/26981 | PCT | 05/00 |
| 6-181576 | Japan | 02/96 |
| 9-063599 | Japan | 03/97 |
| 6-204169 | Japan | 02/97 |
| 10-252469 | Japan | 03/00 |
| 11-233125 | Japan | 08/99 -- |

UNITED STATES PATENT AND TRADEMARK OFFICE
CERTIFICATE OF CORRECTION

PATENT NO. : 6,541,145 B2
DATED : April 1, 2003
INVENTOR(S) : David P. Wilkinson et al.

It is certified that error appears in the above-identified patent and that said Letters Patent is hereby corrected as shown below:

<u>Column 7,</u>
Line 40, please delete "$w_{max} = (0.32/(1+(b/a)^4)) (1-v^2) (pb^4/(Et^3))$" and insert
-- $w_{max} = (0.032/(1+(b/a)^4)) (1-v^2) (pb^4/(Et^3))$ --.

Signed and Sealed this

Eighteenth Day of November, 2003

JAMES E. ROGAN
*Director of the United States Patent and Trademark Office*